US007958669B2

United States Patent
Casimaty et al.

(10) Patent No.: US 7,958,669 B2
(45) Date of Patent: Jun. 14, 2011

(54) LIFTABLE TURFING SYSTEMS

(75) Inventors: Gabriel Casimaty, Richmond (AU); Frank Gregory Casimaty, Richmond (AU); Joseph John McCullagh, Seymour (AU); Yoram Aisenberg, South Bay, FL (US)

(73) Assignee: Strathayr Pty Ltd, Victoria (AU)

( * ) Notice: Subject to any disclaimer, the term of this patent is extended or adjusted under 35 U.S.C. 154(b) by 0 days.

(21) Appl. No.: 12/938,763

(22) Filed: Nov. 3, 2010

(65) Prior Publication Data
US 2011/0045916 A1 Feb. 24, 2011

Related U.S. Application Data

(63) Continuation of application No. 11/440,352, filed on May 25, 2006, now Pat. No. 7,845,113, which is a continuation-in-part of application No. 10/475,613, filed on May 4, 2004, now abandoned.

(30) Foreign Application Priority Data

Apr. 24, 2001 (AU) .................................. PR 4556

(51) Int. Cl.
*B65D 19/00* (2006.01)
*B65D 19/22* (2006.01)

(52) U.S. Cl. ............... 47/1.01 F; 47/65.9; 108/51.11

(58) Field of Classification Search ............... 47/1.01 R, 47/1.01 F, 65.9, 85, 86, 92, 94; 248/346.01, 248/346.02, 346.3–346.5; 108/51.11–57.34; 206/386
See application file for complete search history.

(56) References Cited

U.S. PATENT DOCUMENTS

| | | | | |
|---|---|---|---|---|
| 2,923,512 A | * | 2/1960 | Campbell | 108/55.5 |
| 3,557,512 A | * | 1/1971 | Braeuninger et al. | 52/793.11 |
| 4,023,506 A | * | 5/1977 | Robey | 47/58.1 R |
| 5,309,846 A | * | 5/1994 | Peterson | 108/53.3 |
| 5,429,236 A | * | 7/1995 | Evans | 206/386 |
| RE35,006 E | * | 8/1995 | Ripley et al. | 47/65.9 |
| 5,467,555 A | * | 11/1995 | Ripley et al. | 47/65.9 |
| 5,595,021 A | * | 1/1997 | Ripley et al. | 47/66.5 |
| 5,673,513 A | * | 10/1997 | Casimaty | 47/65.9 |
| 6,263,616 B1 | * | 7/2001 | Hummer | 47/65.9 |

FOREIGN PATENT DOCUMENTS

EP 266701 A2 * 5/1988

* cited by examiner

*Primary Examiner* — Rob Swiatek
*Assistant Examiner* — Danielle Clerkley
(74) *Attorney, Agent, or Firm* — Stites & Harbison PLLC; Douglas E. Jackson

(57) ABSTRACT

A liftable support structure for a turf system, the support structure comprising a skeletal framework having an open based structure with upstanding sides and at least two parallel spaced cross beams, the framework defining open subsections, each subsection having a base defining a ledge structure, each subsection supporting a latticework panel that sits on the ledge structure, the framework having a plurality of spaced lifting points and the cross beams defining access to forklift tines. Also, a pallet for natural or artificial turf comprising a structure moulded in foamed plastics to have a closed planar top surface supported by a lattice work of mutually perpendicular walls defining a flexible open base, the structure defining a pair of elongate spaced parallel channels extending across each side to facilitate forklift tine entry.

13 Claims, 18 Drawing Sheets

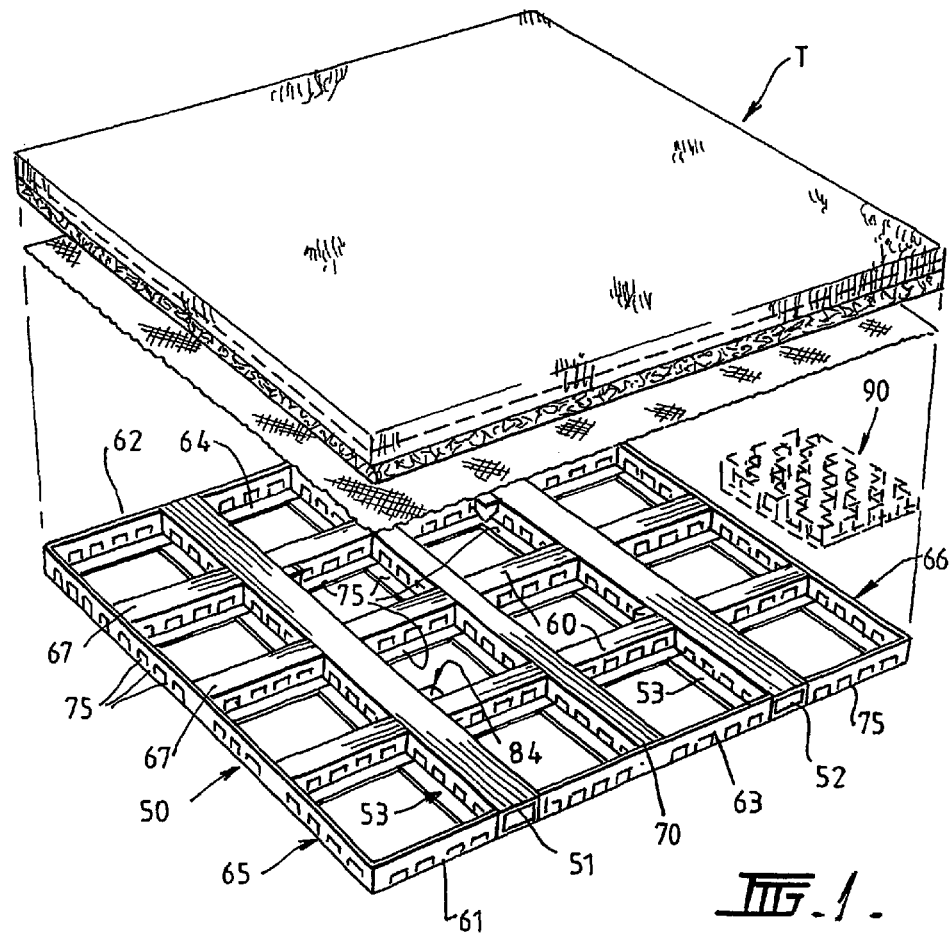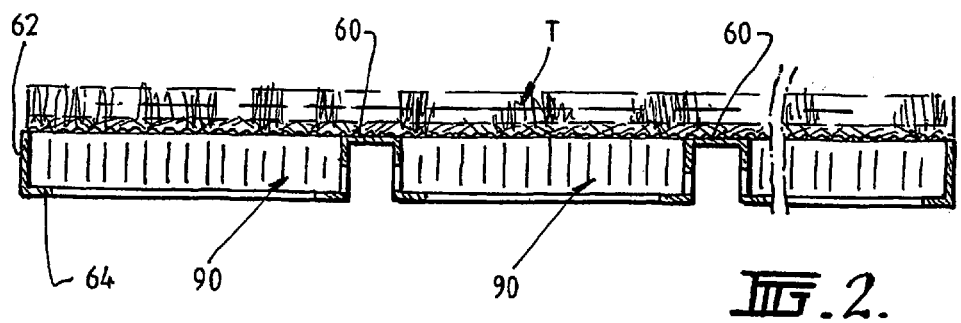

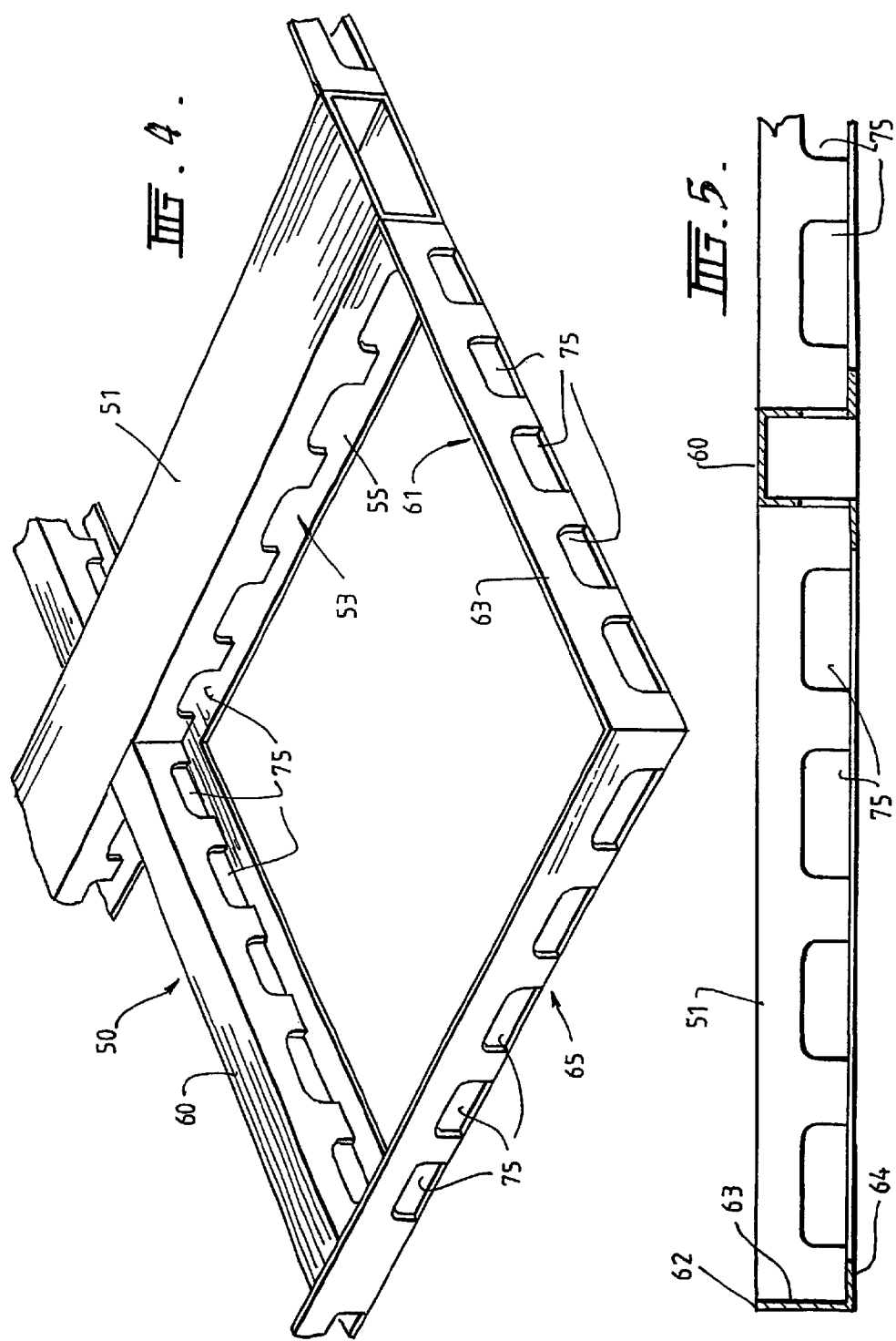

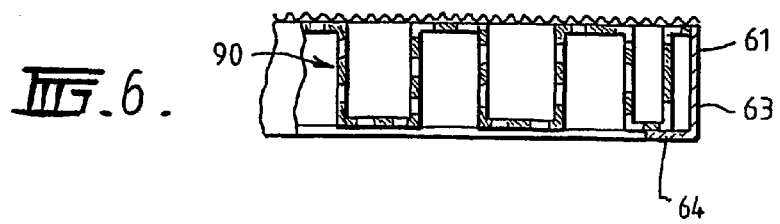
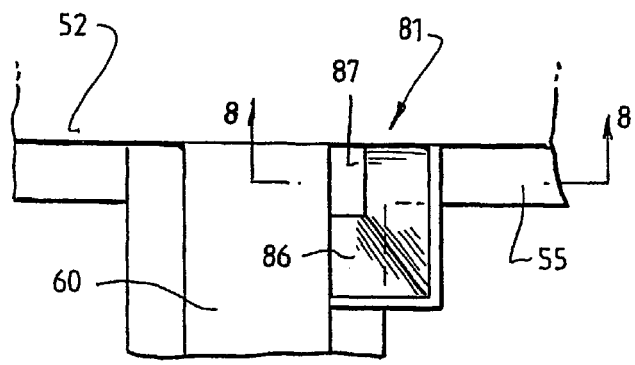
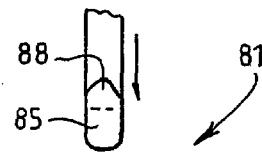
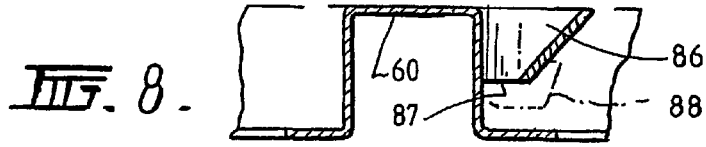
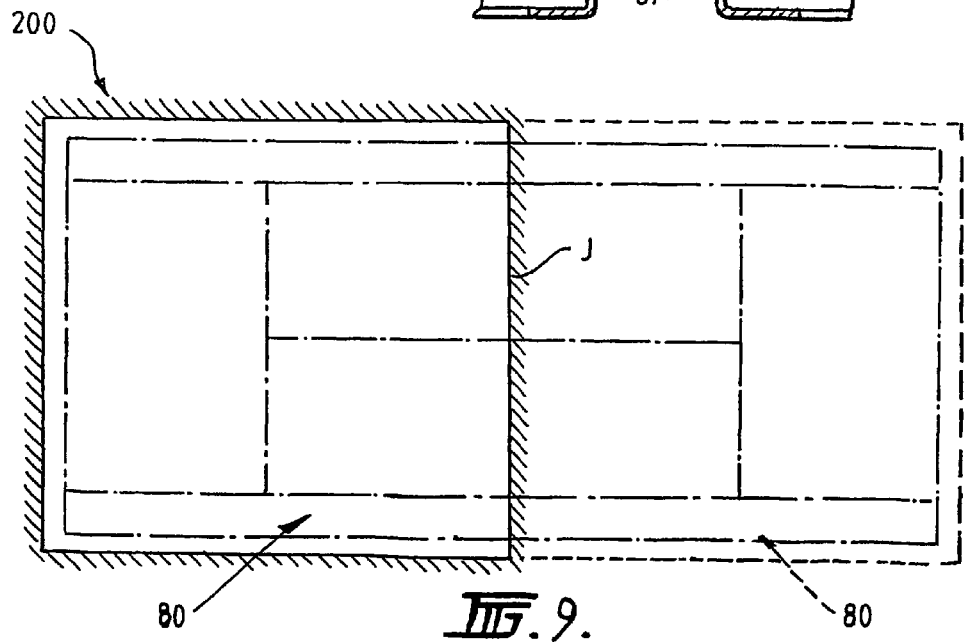

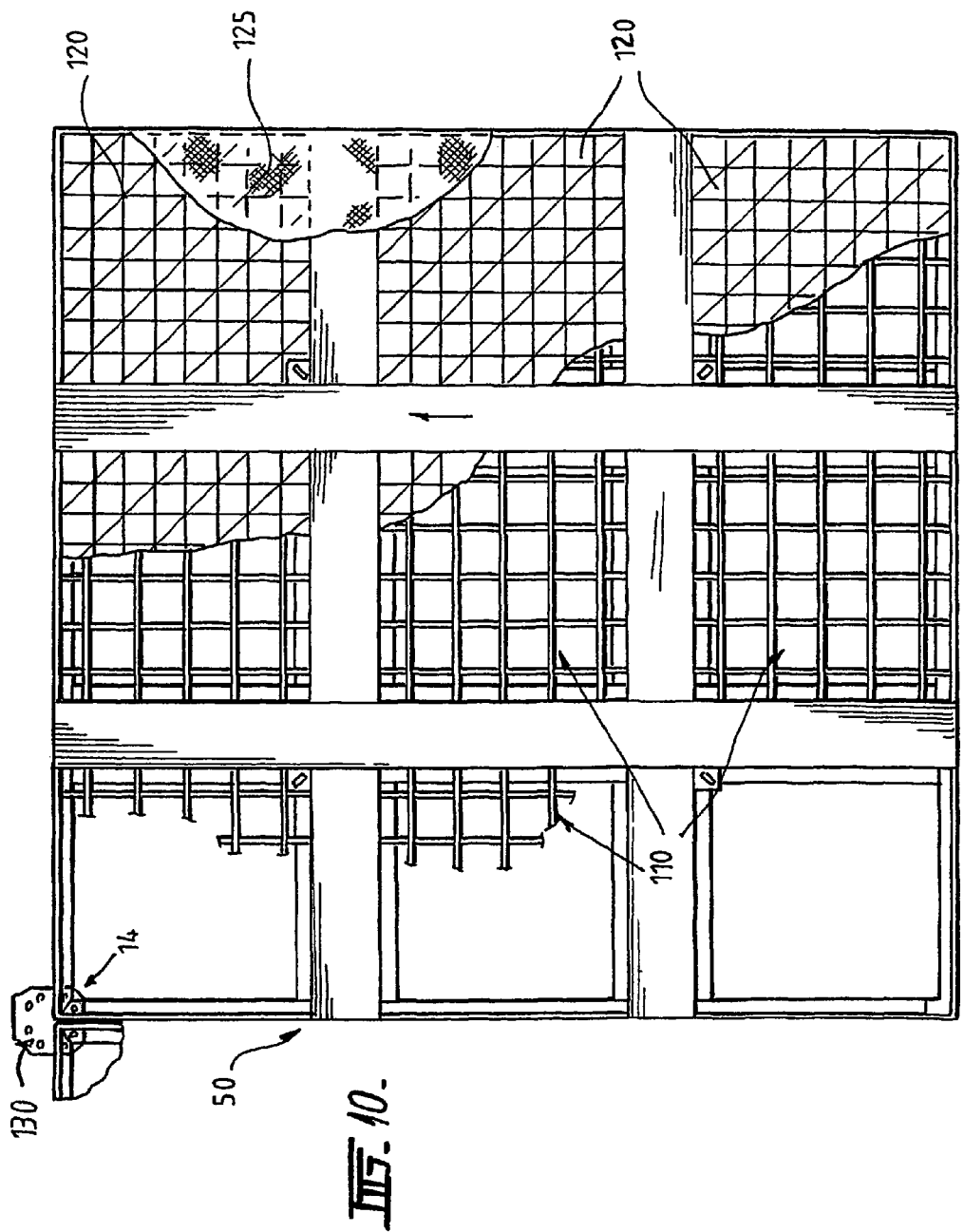

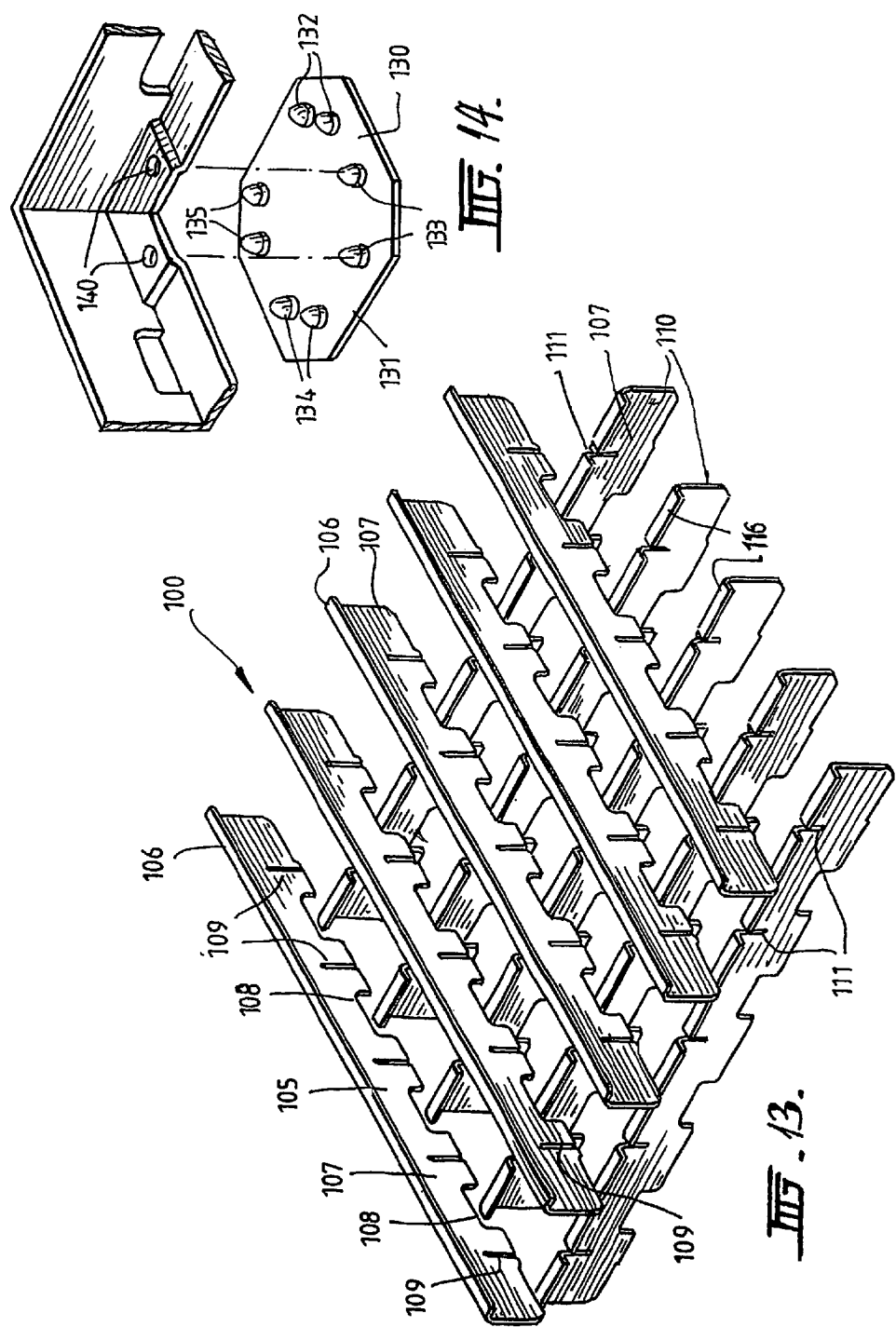

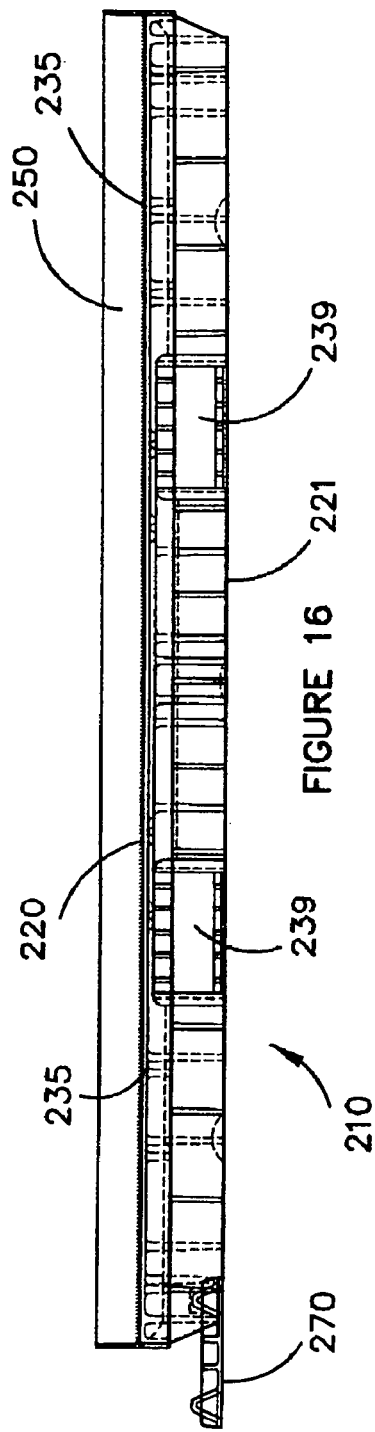
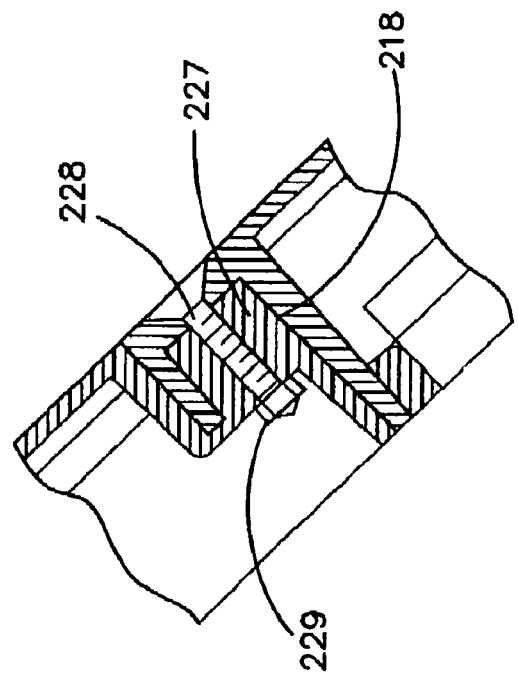

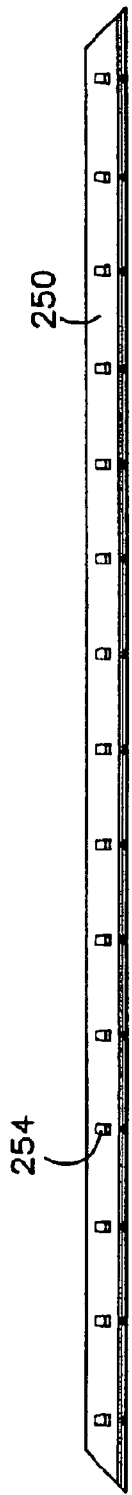
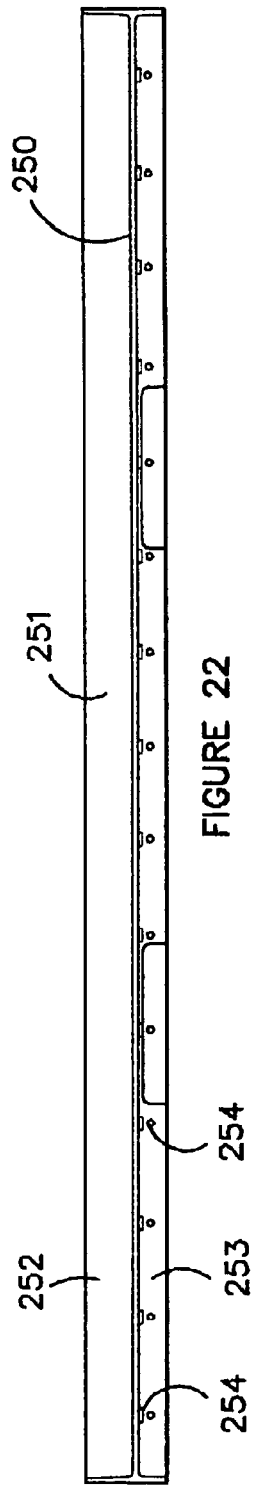
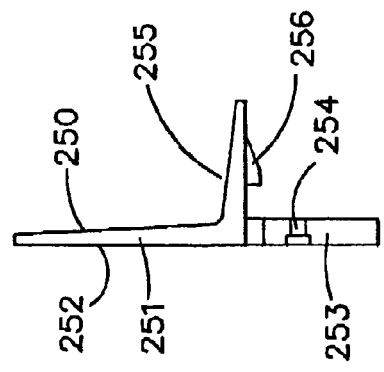
FIGURE 21
FIGURE 22
FIGURE 23

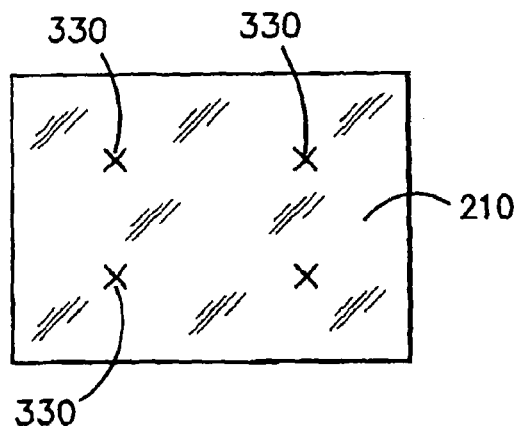
FIGURE 30a
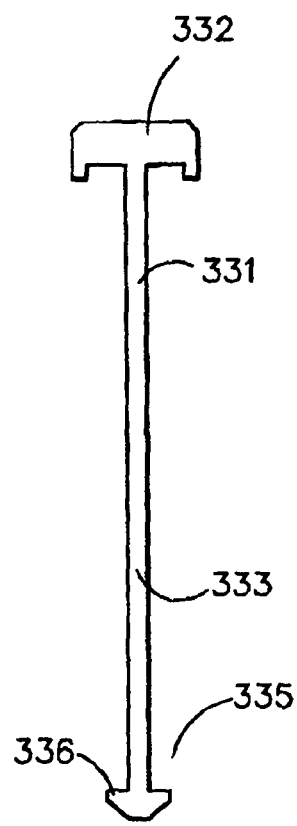
FIGURE 30b
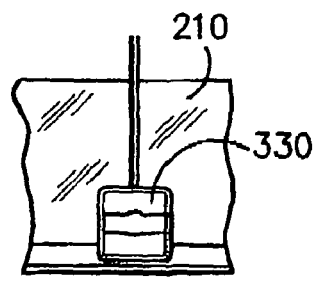 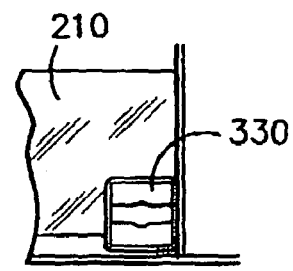
FIGURE 30c

LIFTABLE TURFING SYSTEMS

CROSS-REFERENCE TO RELATED APPLICATIONS

The present application is a continuation of U.S. application Ser. No. 11/440,352, filed May 25, 2006 now U.S. Pat. 7,845,113; which is a continuation-in-part application of U.S. application Ser. No. 10/475,613, filed May 4, 2004 now abandoned.

This invention relates to turfing systems and especially liftable turfing systems that can be used in modern stadia and are readily movable from an operative position to a storage growing environment.

Modern day stadia place enormous demands on turfing areas. If natural turf is required to play team sports and the stadium is used for other entertainment purposes such as to house concerts, the turf is placed under great stress. Modern day stadia also have cantilevered overhanging stands that place much of the turf in shade and some stadia even have closeable roof structures. In consequence, the turf does not get optimum exposure to sun and moisture to ensure healthy grass growth.

There have been many proposals to provide removable turf segments that can be removed and interchanged on demand. As the segments are removed, they can then be positioned in green houses or other environments where there are optimum growing conditions.

However, large turf segments are difficult to lift and transport without damaging the turf segment or surrounding turf areas. Whilst forklifts have proved very successful in facilitating loading and unloading of turf segments there is often no ready access for forklift tines when damaged or worn turf segments have to be removed and replaced.

In a modern day sporting stadium there is an ongoing need for multi purpose facilities. When used for sporting occasions there is a need for a surface that is usually made of natural turf, though in certain circumstances sport fields include artificial turf. Sometimes a sporting field can have a central playing section of natural turf surrounded by artificial turf boundaries. There is often a need to move the turf thereby exposing a concrete base which can then be used to stage concerts, motoring events or even be used as a car park. The turf can be removed to, in the case of natural turf, facilitate growing, watering and regeneration of the turf and in the case of artificial turf, to facilitate maintenance and avoid damage. Although early versions of synthetic/artificial turf could be easily rolled up and removed, later versions that are a rubber/sand infill cannot be rolled up.

This need to constantly remove and reposition turf of both types requires a mechanism to aid the lifting and transportation of the turf products.

One means of providing this aid is to provide pallets or trays on which the turf can be placed. The pallets or trays support the turf in use whilst providing a facility for transportation of the turf. Turf pallets need to provide the desired support for the turf product whilst at the same time have the necessary strength and durability to facilitate lifting and transportation. The strength, durability and weight of such pallets are important criteria that have brought about the present invention.

SUMMARY OF THE INVENTION

In accordance with one aspect of the present invention there is provided a liftable support structure for a turf system, the support structure comprising a skeletal framework having an open base structure with upstanding sides and at least two parallel spaced cross beams, the framework defining opens subsections, each subsection having a base defining a ledge structure, each subsection supporting a latticework panel that sits on the ledge structure, the framework having a plurality of spaced lifting points and the cross beams defining access to forklift tines.

The latticework panel may be injected molded in plastics to sit flush within each subsection. Alternatively the latticework panel may comprise a combination of a criss-cross metal structure on which is supported a thin latticework plastics panel so that the combination sits flush within each substructure.

Preferably the plurality of spaced lifting points each comprises a shaped entry portion adapted to accommodate a lifting lug which can be inserted into the shaped entry portion from above. In a preferred embodiment four lifting points are evenly spaced centrally of the support structure.

Preferably the support structure is constructed from galvanised steel. In a preferred embodiment the cross beams are interconnected by transverse beams to define the plurality of subsections.

In accordance with a further aspect of the present invention there is provided a modular turfing system comprising a liftable support structure of the kind described above, a layer of sand/loam based growing medium positioned on the framework and latticework panels and natural turf positioned on the layer of growing medium.

According to a further aspect of the present invention there is provided a pallet for natural or artificial turf comprising a structure moulded in foamed plastics to have a closed planar top surface supported by a latticework of mutually perpendicular walls defining a flexible open base, the structure defining a pair of elongate spaced parallel channels extending across each side to facilitate forklift tine entry.

Preferably the pallet has edge strips on the sides of the structure, the edge strips having an upper edge above the top surface of the pallet.

In a preferred embodiment, the closed planar top surface has specifically positioned drainage holes.

Preferably the pallet is moulded in two halves joined to form a square or rectangle, the join being about a diagonal.

In one embodiment, the join between the mould halves includes a plurality of spaced male projections in one mould half that are arranged to be accommodated in a plurality of similarly spaced female recesses in the other mould half. In a preferred embodiment fasteners are used to join the male projections to the female recesses.

The pallet is preferably constructed from commingled plastics, foamed through the use of Nitrogen gas. The plastic is preferably high density polyethylene.

In a preferred embodiment each corner of the pallet is located on a locator plate that facilitates the location of one corner of four adjacent pallets.

BRIEF DESCRIPTION OF THE DRAWINGS

Embodiments of the turf system of the present invention will now be described by way of example only in which:

FIG. 1 is an exploded perspective illustration of a turf module including turf on top of a support structure, FIG. 2 is a schematic cross-sectional view of the turf module, FIG. 4 is a perspective view of one corner of the support structure, FIG. 5 is a cross-sectional view of the support structure taken along the lines 5-5 of FIG. 3, FIG. 6 is a cross-sectional view of the support structure taken along the lines 6-6 of FIG. 3, FIG. 7 is an enlarged plan view of a lifting point illustrated in the circle A in FIG. 3, FIG. 8 is a cross-sectional view taken along the lines 8-8 of FIG. 7, FIG. 9 is a plan view showing dimensions of a tennis court with an illustration of how the turf system can be used to define a tennis court, FIG. 10 is a plan view of a turf module illustrating a support structure in accordance with a second embodiment, FIG. 13 is an exploded perspective view of a criss-cross structure of the subsection shown in FIG. 12, and FIG. 14 is an exploded perspective view of a locater that connects the adjacent corners of support structures.

FIG. 16 is a side elevational view of the pallet and location plate;

FIG. 17 is a cross sectional view taken along the lines A-A of FIG. 15;

FIG. 21 is a plan view of an edge retainer that forms part of the pallet;

FIG. 22 is a side elevational view of the edge retainer;

FIG. 23 is an end on view of the edge retainer;

FIG. 30a is a plan view of a pallet illustrating the location for vertical lifting;

FIG. 30b is a side elevational view of a tool for use in vertical lifting;

FIG. 30c illustrates the design and location of sockets in the pallet to accommodate the tools shown in FIG. 16a.

DESCRIPTION OF THE PREFERRED EMBODIMENTS

In a first embodiment as shown in FIG. 1-8 of the accompanying drawings a turf module 10 comprises natural turf T positioned on a support structure in the form of a metal skeletal framework 50 that supports a plastics latticework 90 with the turf T covering the upper surface.

Figure 3:
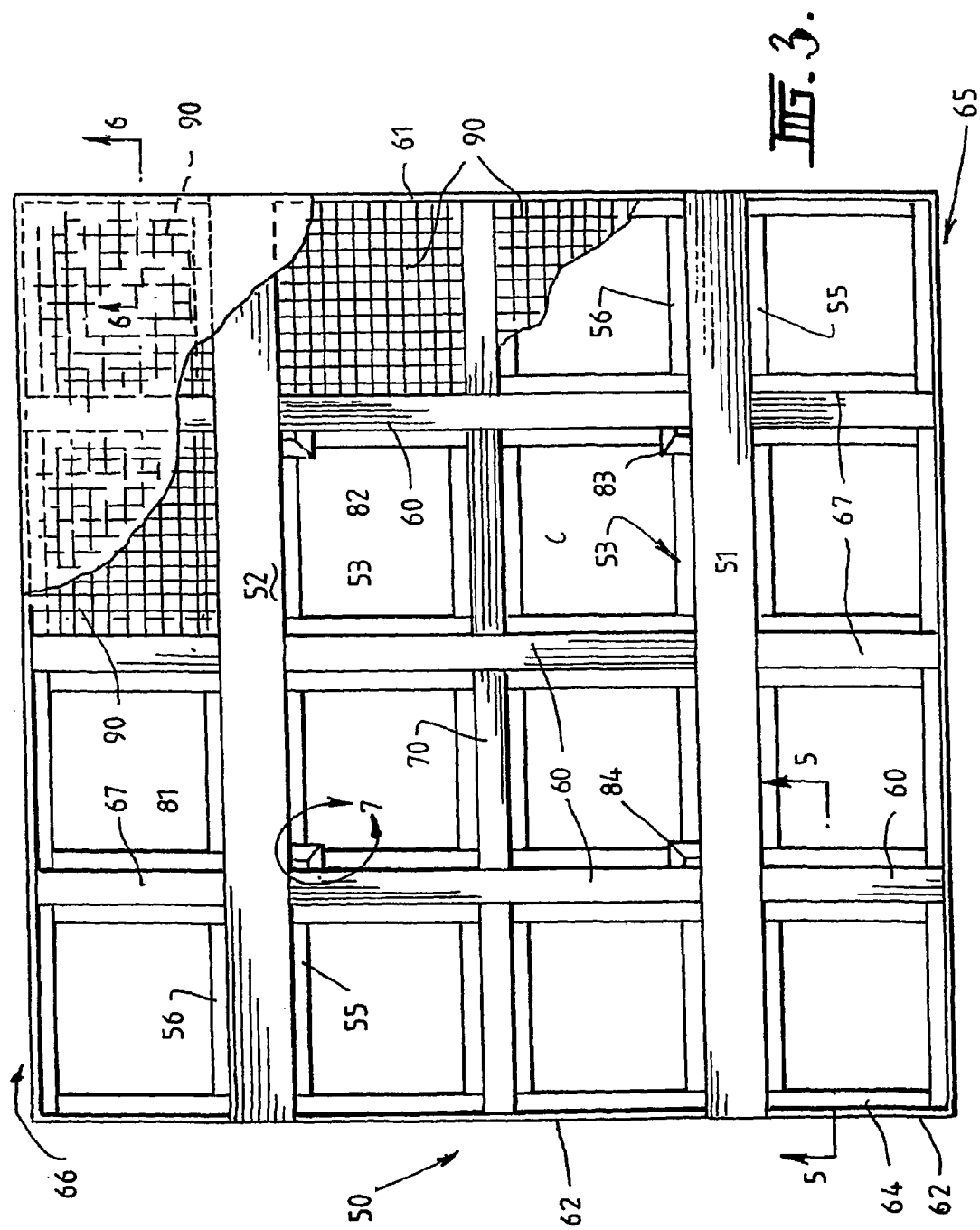
FIG. 3 is a plan view of the turf module.

The framework 50 is fabricated to be either a square (preferably 2.4 m) or a rectangle in plan (5 m×3 m) with subsections that are arranged to support the plastics latticework 90 that sits in each subsection. The frame 50 is fabricated from steel and essentially comprises two parallel spaced apart main beams 51, 52 of a inverted C-shape. A plate 53 is welded to the underside of the beams to extend outwardly on each side of the beam to define a small ledge 55, 56 that will run along on the underside of each edge of the beam. The main beams 52, 53 are spaced by lateral spacing beams 60 that are formed, as shown in FIG. 5, to have a top hat shape in section. These beams 60 are equally spaced between the main beams 51, 52 and are welded to the main beams to define the spacing of the main beams. Two pieces 61, 62 of angle iron are then welded across the ends of the main beams 51, 52 with the vertical flange cutout to leave the end of the main beam open as shown in FIG. 4. The angle iron 61, 62 has one flange 63 defining the upstanding side wall and the other flange 64 defines a ledge 64 on the base of the frame. Similar pieces 65, 66 of the angle iron are then welded to the longitudinal sides to close off the square array as shown in FIG. 3. Further reinforcing transverse beams 67 are then positioned between the main beams and the lateral edges to be coaxial with the transverse beams positioned between the main beams. A final series of strengthening beams 70 are positioned longitudinally at the mid span between the main beams. All the beams have vertical flanges with equally spaced rectangular cutouts 75 towards the base of the flange. These cutouts 75 are shown with particular reference to FIGS. 4 and 5.

As described above, the subsections have inwardly turned ledges which act as support for a square shaped array of plastics latticework 90 available as a proprietary item sold under the trade mark ATLANTIS™.

The latticework 90 that is manufactured of heavy duty polypropylene. In one embodiment the latticework is 52 mm×260 mm×480 mm and sits approximately 25 mm below the top surface of the frame. A fine cloth or plastics mesh is placed over the latticework 90 and then the gap between the top of the latticework 90 and the frame is filled with sand and leveled off. The fine cloth prevents the sand filtering through the latticework. Turf is then placed on top of the sand. Other options include placing a fine mat or mesh on the top of the plastics latticework, placing a layer of plastics panelling to bring the infill up to the level of the steel structure. A second mat is then positioned over the assembly prior to the turf.

In another option the latticework 90 is of sufficient height to finish flush with the top of the steel structure.

The turf T is a product of the kind described in many of our earlier patents. This turf product T comprises a sand and peat moss base including reinforcing elements in the form of plastics mesh elements sold under the registered trade marks NETLON or REFLEX. A suitable grass may be sown in the sand plastics base and raised in optimum glasshouse conditions. The turf can be planted by seeding or by locating sprigs or stolons of a grass such as couch grass.

In one embodiment the turf can be grown in situ on the support structure 50. The top of the latticework cells is covered by a fine mesh cloth. The gap between the top of the sides of the frame and the latticework elements is filled with a growing medium preferably a mix of sand and plastics mesh elements. The mesh elements are cut to a suitable length and then homogeneously mixed with sand at about 5-6 kg per m$^3$. Elevated sides of wood, metal or plastics can be placed against the sides of the frame and more growing medium (100-150 mm) is added. The turf is then added by seeding or sprig location. Once the turf is established and matured the module is then transported to the site of usage at which time the elevated sides are removed.

In another embodiment the turf is grown off site until matured. The matured turf product is normally between 10 to 40 mm in thickness and this can be positioned on top of the sand covered frame that supports between 100 and 150 mm of growing medium including mesh elements.

In the embodiment shown in FIGS. 10 to 13, a turf module 10 is illustrated in which the framework 50 is similar to the first embodiment. However in this embodiment, the plastics latticework 19 is replaced by a composite structure in the form of a crisscross metal support structure 100 and a thin plastics latticework panel 120 that sits on top of the crisscross structure 100. A row of cloth or fine plastics mesh 125 is then rolled onto the assembly as shown in FIG. 10 to cover the framework 50 at which time turf may be placed directly on top of the framework to complete the module. As described earlier in the specification, turf could also be grown in situ on the framework in the manner described above.

Figures 11, 12:
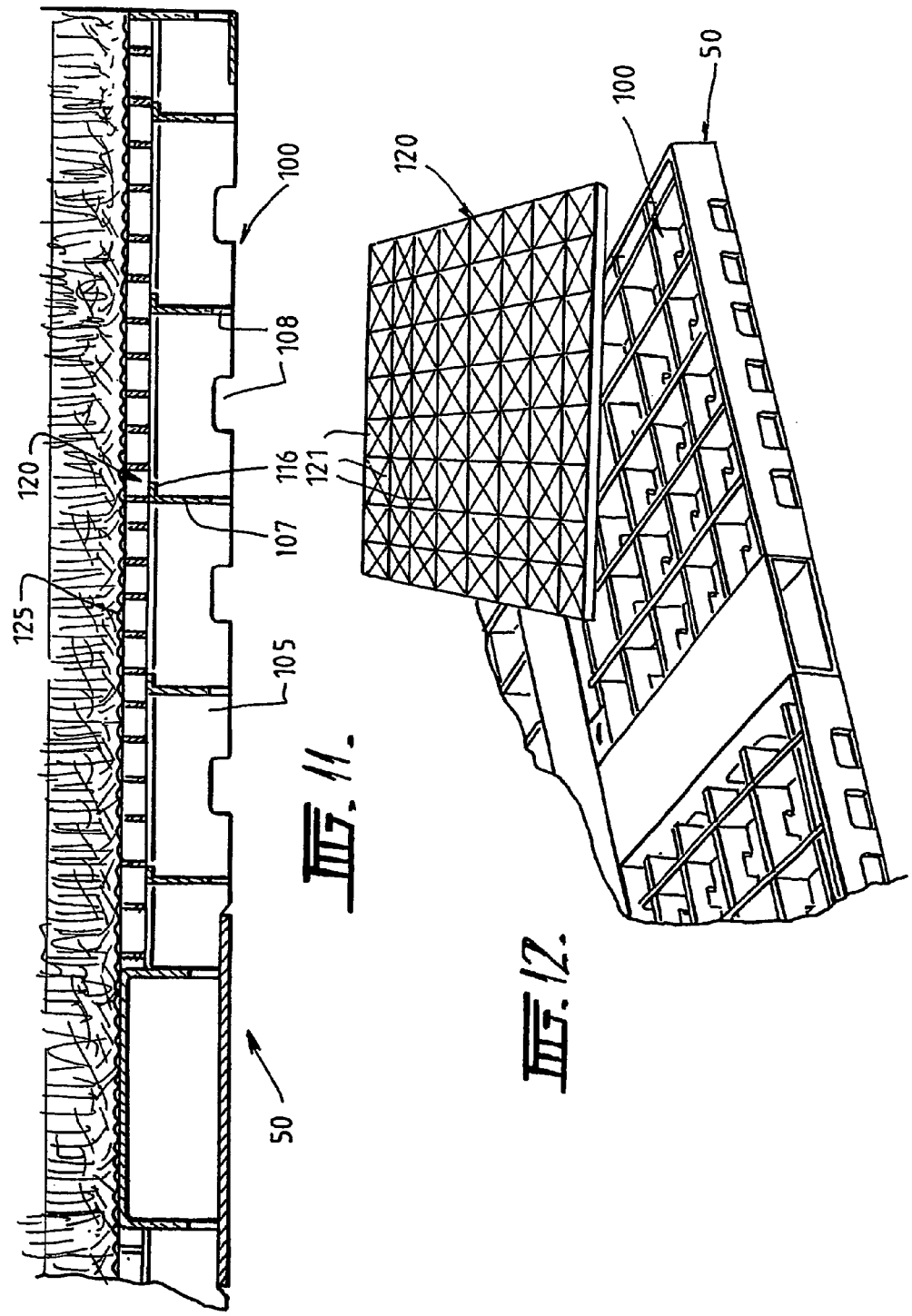
FIG. 11 is a cross sectional view of the turf module taken along the lines 11-11 of FIG. 10.
FIG. 12 is an exploded perspective view of one subsection of the support structure.

The crisscross support structure 100 is shown in FIG. 13 and comprises a first plurality of elongate planar metal strips 105 that each have an upper flange 106 turned through 90° to the planer surface 107 of the strip. The underside of each strip 105 has four equally spaced rectangular cut-outs 108 and a series of five equally spaced slots 109 extending approximately halfway up the side 107 of the strip 105. A second plurality of strips 110 complete the crisscross structure 100 are substantially similar except that the slots 111 are provided equally spaced downwardly extending from the flange 116 at the top of the strips 110. The members inter-fit together in a mutually perpendicular array as shown in FIG. 13 by interaction between the slots 109, 111 in each strips 105, 110. As shown in FIG. 11, the crisscross steel structure 100 sits on the base of the framework on the inturned lips and the base structure and extend upwardly to about three quarters of the height of the framework. The remaining quarter is filled by a thin plastics latticework panel 120 that is shown in cross-section in FIG. 11, in plan in FIG. 10 and in a perspective view in FIG. 12. The latticework panel 120 has a series of diagonally extending cross-members 121 that ensure that there are no large voids in its upper surface and thus adequately support the cloth surface 125 that is placed directly under the soil/sand aggregate. As shown in FIG. 11, the combination of the crisscross steel structure 100 and the thin latticework panel 120 causes each sub-section to be flush with the side wall of the frame work.

Where turf modules of the kind described above are to be placed together, a locater 130 is illustrated in FIG. 14. The locater 130 comprises a flat substantially square shaped plate 131 that has four pairs 132, 133, 134 and 135 of upstanding spigots which are positioned so that they fit into apertures 140 in the base of the framework adjacent each corner of the framework as shown in FIG. 14. Thus, each corner of each framework can be located on a pair of upstanding spigots so that each locater has the effect of locating four modules in a square array. The flat plates are manufactured of galvanised steel and can be simply placed on the base structure which is usually concrete, and it is a simple matter to lower the modules so that the studs located in the apertures in the base structure of each framework. The locaters 130 keep the turf modules in close proximity with about a 10 mm gap between each module. The turf modules can then only be separated from each other by lifting them clear of the locaters 130.

The turf module can be simply lowered directly into a prepared recess that can be lined with concrete. In other alternatives the turf module can be positioned on a sand base.

In some situations where the module is used for a cricket wicket the sides of the module could be slightly tapered to diverge upwardly. A suitable taper would be approximately 10 mm outward diversions per side in a depth of 150 to 200 mm. A similarly profiled female receptor can be positioned in the ground defining the position of the cricket wicket. The female receptor would also be tapered so that the module can be lowered as a tight fit into the receptor. The female receptor could be manufactured in galvanised steel, concrete or other suitable materials.

In a preferred form the female receptor will be 25 m in length and 3 m in width. The elongate sides will be tapered to diverge outwardly and upwardly from the base at about an angle of 8° to the vertical. The end walls of the receptor will also be similarly tapered. The cricket wicket would comprise five support structures laid end to end in abutting contact. Each structure will be 5 m by 3 m thus producing the 25 m by 3 m cricket wicket. Each structure would have its longer sides tapered to correspond with the taper of the female receptor. The end two structures would also have a tapered end to mate with the short ends of the receptor. However the abutting edges of the structures would be perpendicular to ensure parallel abutment. A long strip of turf would be placed on the array of structures to ensure the absence of lateral seams. In this embodiment each structure would have connectors for lifting lugs positioned at spaced intervals along the lateral edges. At least three pairs of connectors will be provided on each structure. The structures could be bolted together end to end and would be transported in one piece. Alternatively the structures could be transported individually and then assembled on site and covered in turf. In a situation where a whole cricket square is to comprise modules of the kind described above then it would be understood that a series of receptors would be placed in a spaced parallel array with a grass gap of between 0.5 and 1.0 m between adjacent receptors.

Similar modules can be used to cover horse racing track crossovers. On non race days a recessed concrete, gravel or bitumen road crosses the grass race track. On race days turf modules having frames of the kind described can be lowered into position onto the recessed road to provide a turf surface flush with the rest of the grass track. The modules would be stored in a nearby nursery site on non race days.

The exposed plastics latticework cells together with the base of the framework provide an aerobic irrigation channel for the root structure of the turf. The open structure of the underside of the module not only provides an aerobic irrigation channel but provides a vehicle for warm air to be passed under the module to encourage root growth in cold climates. The main beams define access to the tines of a fork lift from any side. The rectangular cutouts 75 at the base of the assembly allow free movement of water for irrigation purposes.

Although the frame can be lifted by use of forklift tines, it has been designed so that it can also be lifted from above. As can be seen in FIG. 3, in four corners of an inner square of the frame are positioned fabricated brackets 80, 81, 82, 83 into which a lug 85 can be vertically inserted and then turned to lock against the bracket. Each bracket 80, 81, 82 & 83 includes a funnel shaped entry 86 terminating in a rectangular slot 87 in the base. The lugs 85 have a projection 88 that locates against the wall of the slot 87 when the lug is turned through 90° thereby locking the assembly together. The locked position is shown in dotted profile in FIG. 8. In this manner four lugs 85 are vertically inserted into the brackets 80, 81, 82, 83 to provide four spaced lifting points. A tractor or a crane can then be used to lift the whole slab vertically. Lugs are inserted through the turf that sits on the top of the slab and the funnel shaped entry is provided to make it easier to line up the lugs with the brackets. The positioning of the overhead lug assembly can be determined by eyeing the lateral edges of each square and positioning the lifting assembly directly over the center so that the lugs line up with the brackets.

Other means of determining the lifting points is to use a surveying system that can position the lifting points to within 1 or 2 mm. A mark can then be placed on the turf above the lifting points to direct entry of lugs through the turf. One such system would include mapping out the turfed surface to locate pipework, sprinkler heads and turf modules. This map would then be programmed into a computer that has appropriate location software. A surveyor's theodolite can then be used to ascertain the exact location of the mapped parameters stored by the software.

The penetration of the lugs through the turf causes little damage to the turf yet provides a ready means of lifting slabs of the turf without having to use a forklift against the underside of the frame.

The frames 50 can be bolted or secured together using locaters 130 of the kind shown in FIG. 14 to define much larger surfaces such as a cricket wicket or half a tennis court. A single layer of turf is positioned and grown over the top of the assembly of frames to ensure there are no transverse seams and the whole assembly can be lifted through the top of the turf via the lifting points.

The provision of a turf system that is as wide as 13 sq metres allows for instance, as illustrated in FIG. 9, two turf assemblies 80 to be used to make a tennis court 100. The recommended size for a tennis court 100 from baseline to baseline is about 24 m and the width of a tennis court is traditionally 11 m. Thus, a 12.5 m long by 11.5 m wide assembly 80 of frames 50 can be used as one-half of the court and this can be butted to another assembly of frames 50 (not shown) to define the rectangular tennis court shown in FIG. 9. The abutting join J-J would be placed under the net where there is no play and thus it is possible to immediately erect a tennis court 100 with optimum turf with a single join that has no effect on play.

Similarly it is understood that larger surfaces such as the various codes of football fields can be formed using a small number of very large assemblies. A single long thin assembly (25 m by 3.0 m) can be used as a cricket wicket. A number of such assemblies can be placed together longitudinally to form a whole cricket "square". Alternatively a gap of grass of between 0.5 and 1.0 m could be left between each wicket to assist in drainage and reduce wear. At the end of the season the assemblies can be removed and replaced by other turf products so that the stadium can be used for football without damaging the cricket wicket.

The metal frame may be constructed in galvanised steel or may be in steel covered with a rubber or plastics coating to protect it from corrosion. The frame is sturdy yet sufficiently light for easy transportation and the combination of the frame and the plastics latticework cells provides a very efficient and transportable turf product particularly for use in sporting environments such as soccer fields, tennis courts and cricket squares.

As shown in FIGS. 15 to 31 of the accompanying drawings a pallet 210 for use to support natural or synthetic turf is moulded in foamed plastics in two halves 211, 212 that are joined about a diagonal 213. The pallet 210 is square in plan to define an upper surface 220, under surface 221 and sides 222, 223, 224, 225. Each side of the pallet has detachable secured thereto an edge retainer 250 to define the completed pallet and each pallet is arranged to sit on appropriately positioned locators 270 that engage a corner of the pallet 210.

It is however understood that the pallet may be moulded as a single piece with or without edge retainers. Thus, depending on the end use of the pallet it can be moulded to have no edge retainers at all. Alternatively, it can be moulded so that fixed edge retainers are integrally formed in the pallet or it can be moulded as shown in FIGS. 15 to 23 whereby edge retainers 250 can be detachably secured thereto. Further details on the edging systems are described later in the specification.

The pallet is preferably moulded in either one or two pieces to define a square that is 2250 mm. It is understood however that the square could be larger such as 2400 mm or in some circumstances it is understood that the pallet would be considerably smaller such as a 1250 mm square. Essentially, the pallet is usually square, although it can be rectangular, and has side dimensions varying between 1250 mm and 2700 mm.

Figure 18:
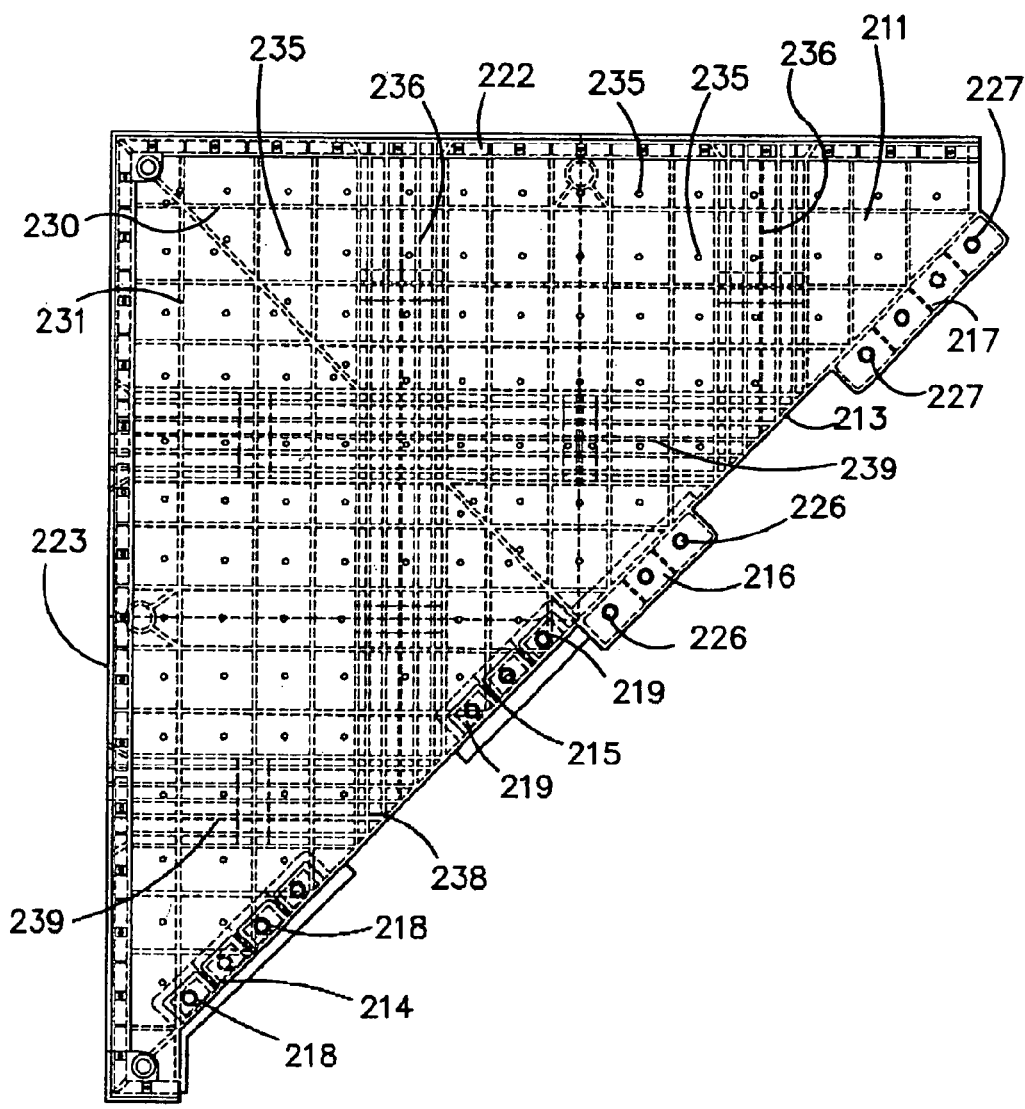
FIG. 18 is a plan view of one mould section that forms half of the pallet.
Figure 19:
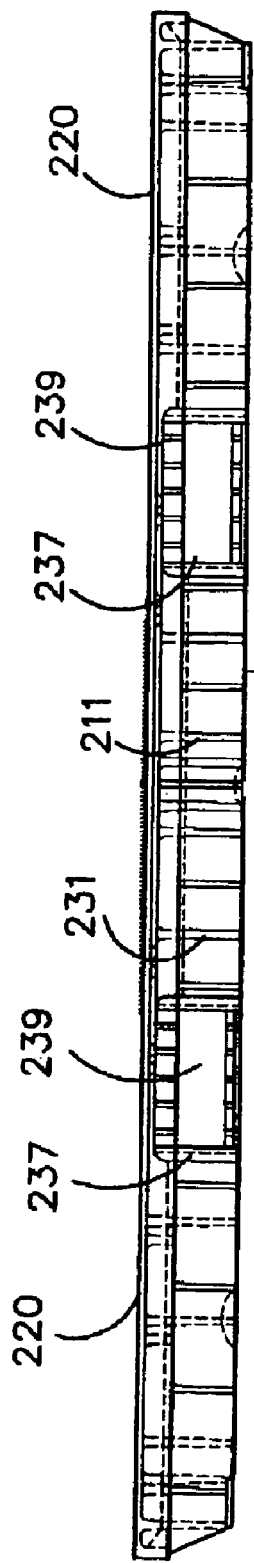
FIG. 19 is one side elevational view of the mould section.
Figure 20:
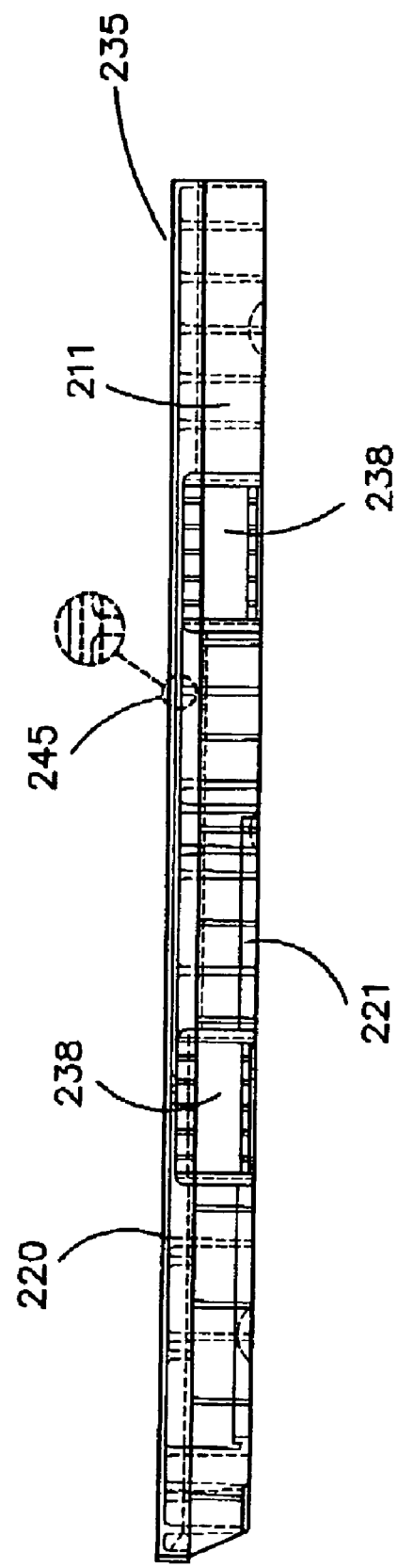
FIG. 20 is the other side elevation view of the mould section.

As described above each pallet comprises two halves 11, 12 that are joined together. One half is shown in FIGS. 18, 19 and 20 and comprises a top side 222 and an edge side 223 joined by a diagonal 213 that has a pair of spaced recesses 214, 215 and a pair of spaced projections 216, 217. The first recess 214 defines four slots 218 and the second recess 215 has three slots 219. The first projection 216 near the centre of the mould half 211 has three projecting fingers 226 and the second projection 217 towards the edge of the mould half has four projecting fingers 227. The projecting fingers 226, 227 are arranged to be a sliding fit within the slots 218, 219 of the other mould half and fasteners in the form of countersunk bolts 228 and nuts 229 allow the two mould halves to be bolted together to form the square pallet shown in FIG. 15. The lower edge 223 of the mould half 11 shown in FIG. 20, has a completed corner whilst the other edge 222 of that mould half has an incomplete corner which would be completed by the corner of the other mould half so that about the diagonal one corner is defined by one mould half 211 and the other by the other mould half 212.

Each mould half 211 or 212 has a substantially planar upper surface 220 that is supported by a plurality of mutually perpendicular latticework walls 230, 231 that extend down to an open base structure 221. This wall structure is shown with particular reference to FIGS. 19 and 20. The density of the lattice work wall structure provides adequate support for the planar surface 220 of the pallet 210 and that surface is provided with a plurality of drainage holes 235 that are usually tapered in cross section and are located centrally of each lattice work section as shown in FIG. 18. The mould halves 211, 212 are also reinforced by a series of elongate parallel wall structures 236 that are positioned in spaced apart clusters to define as shown in FIG. 20 the reinforced walls 237 of rectangular slots 238 that extend along the length of the pallet from both sides to define a pair of spaced parallel slots 238, 239 for access of forklift tines. The top edge of FIG. 18 shows how the reinforced wall structure of each tine slot is slightly flared outwardly to facilitate tine entry.

Figure 15:
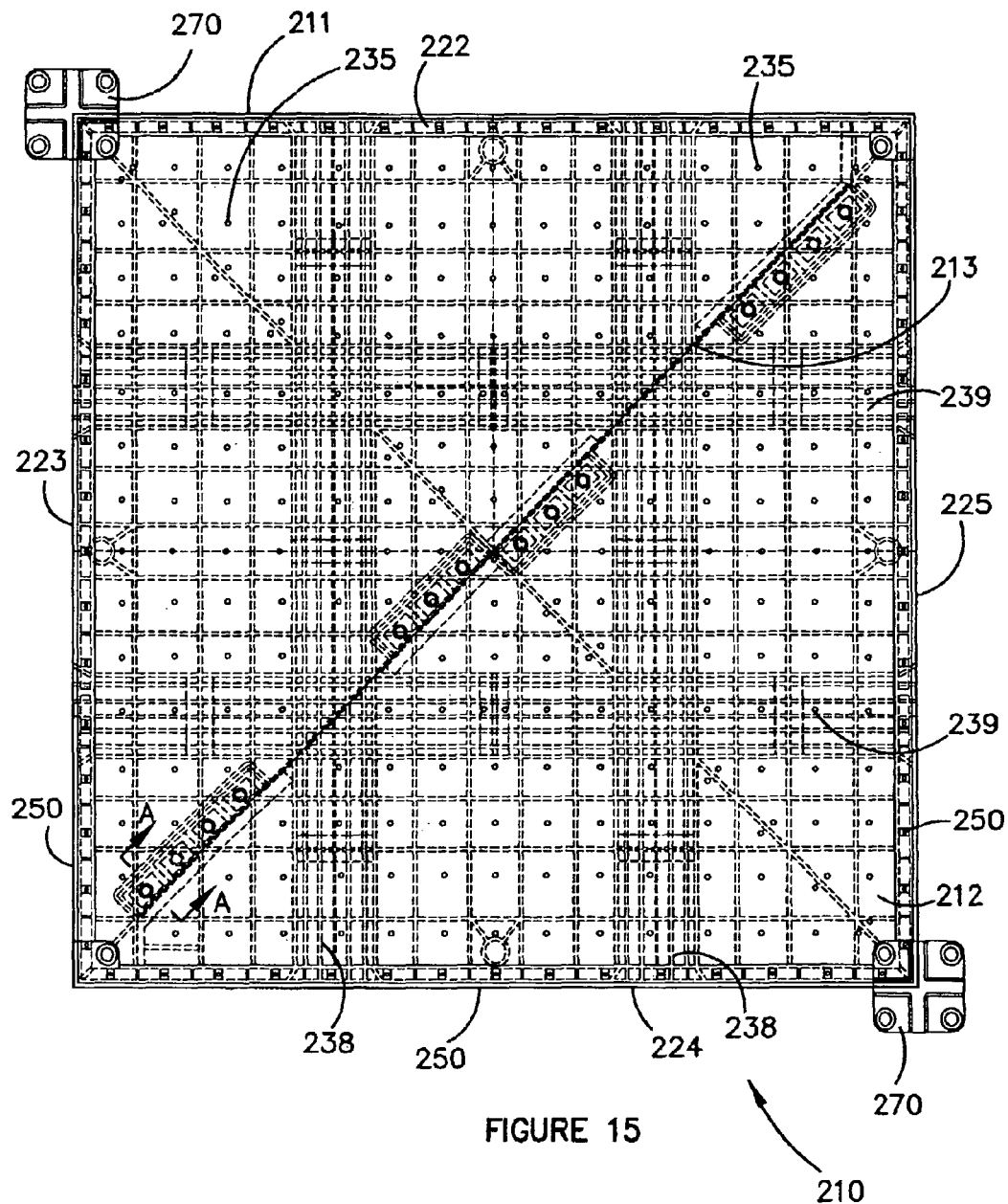
FIG. 15 is a plan view of a pallet for supporting natural or artificial turf supported in two opposite corners by locator plates.

In the embodiment of FIGS. 15 to 23, each side of the pallet 210 is reinforced by an edge retainer 250 shown in FIGS. 21-23. The edge retainer 250 comprises a vertical wall 251, the upper half 252 of which is part of the peripheral rim of the pallet 210 and the lower half 253 of which includes an aperture 254 through which a fastener can enable the edge retainer 250 to be screwed to the edge of the pallet 210. As shown in FIGS. 22 and 23, thirteen fasteners secure each edge retainer 250 to the pallet mould halves. The vertical wall 251 of the edge retainer has a horizontally projecting web 255 on one side with a downwardly extending lip 256 that clips against the edge of the mould halves 211, 212. As shown in the plan view of FIG. 21, the opposite ends of the edge retainer 250 is tapered inwardly at 45° to enable the edge retainers to join in a bevelled fashion at the corners as shown in FIG. 15. The upper half 252 of the wall 251 extends above the upper surface of the mould halves by 81 mm to accommodate and locate natural turf that it located in the pallet.

Figure 27:
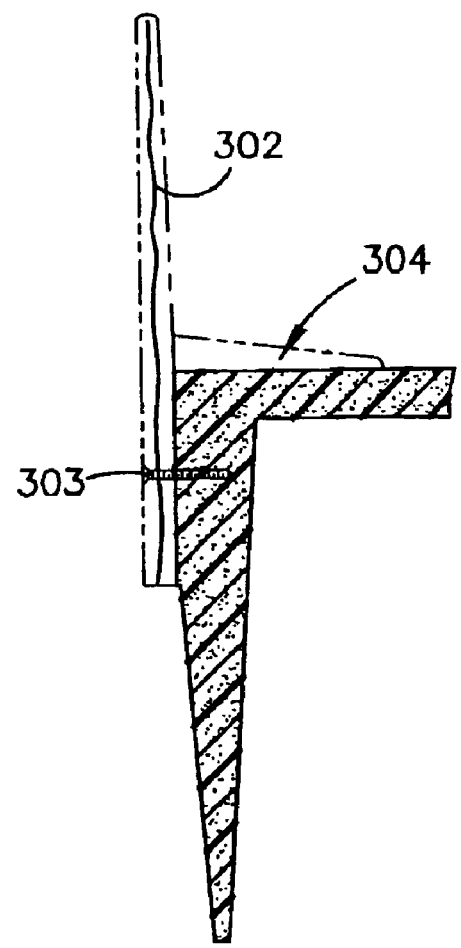
FIG. 27 is a similar cross sectional view showing the pallet formed without an edge with the facility to screw on a detachable retaining edge.
Figure 28A:
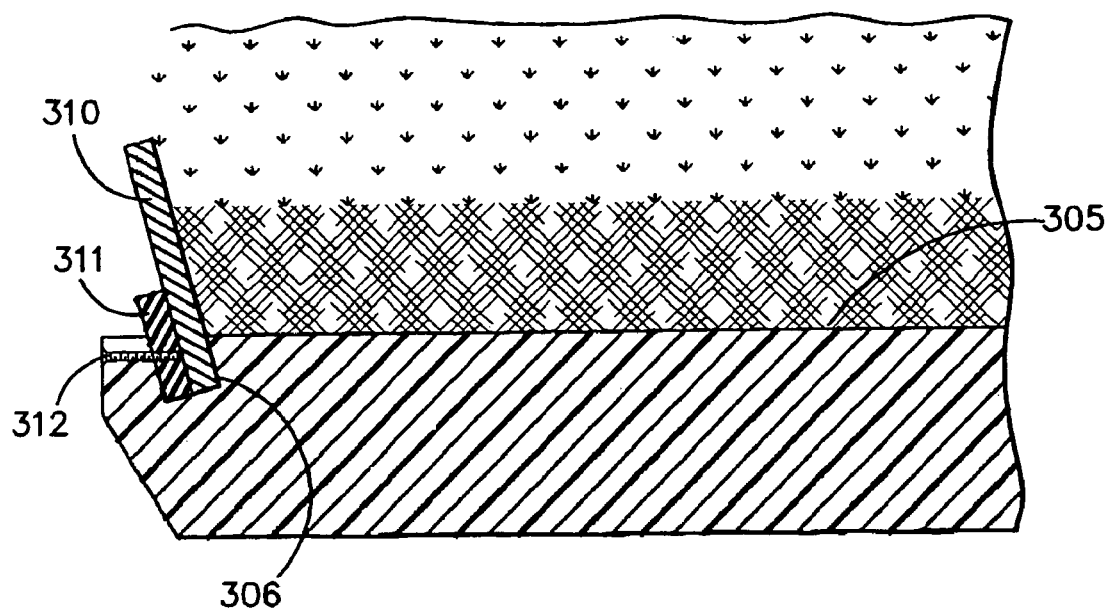
FIG. 28a is a partial view of a pallet illustrating the provision of a slot that can accommodate a removable edge strip.
Figure 28B:
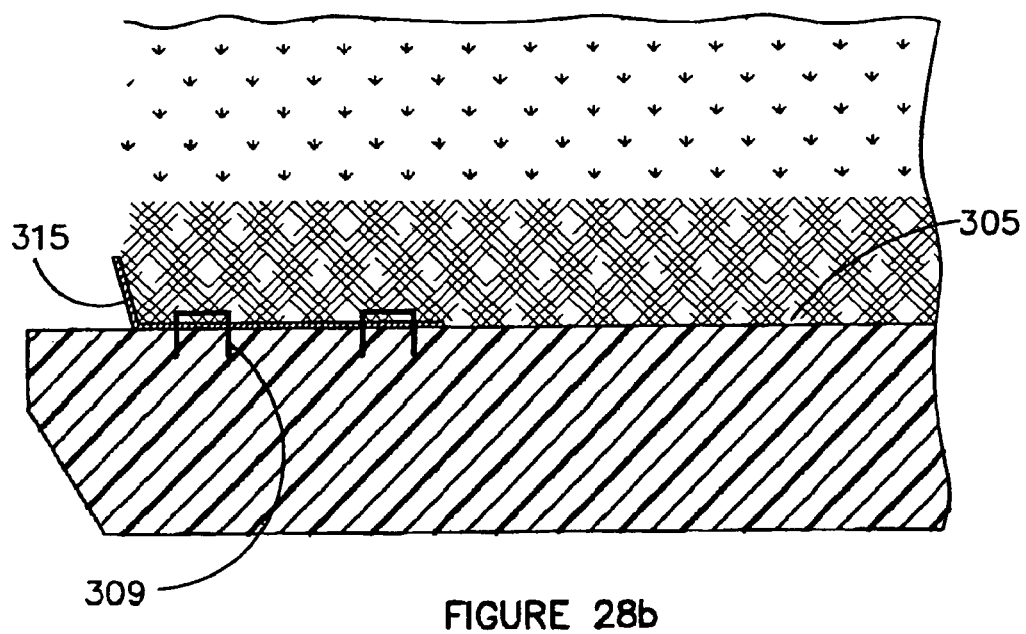
FIG. 28b is a schematic illustration of a variation on that theme.
Figure 29A:
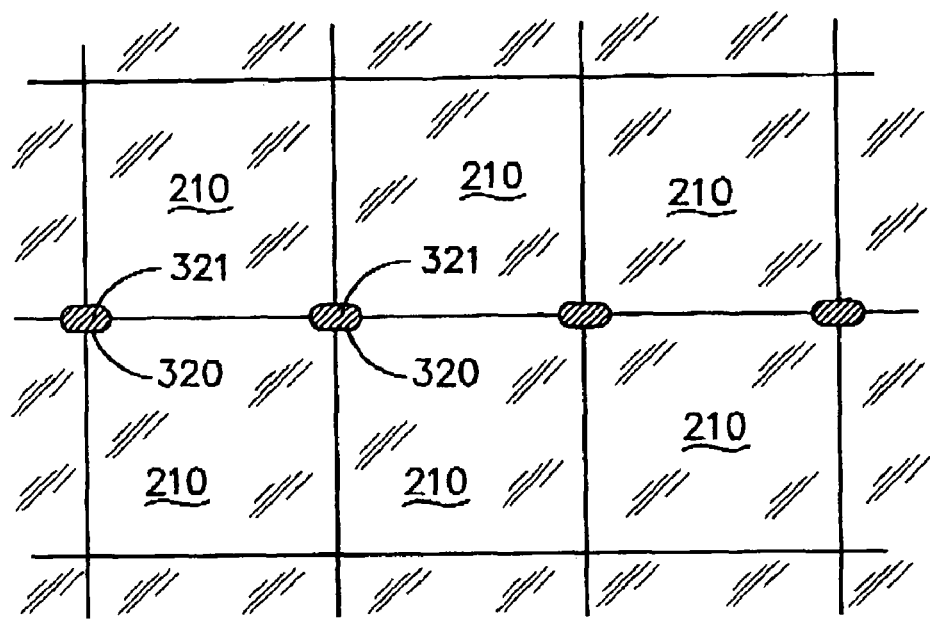
FIGS. 29a and 29b are plan and side elevational views of a mechanism for securing edges of adjacent pallets together.
Figure 29B:
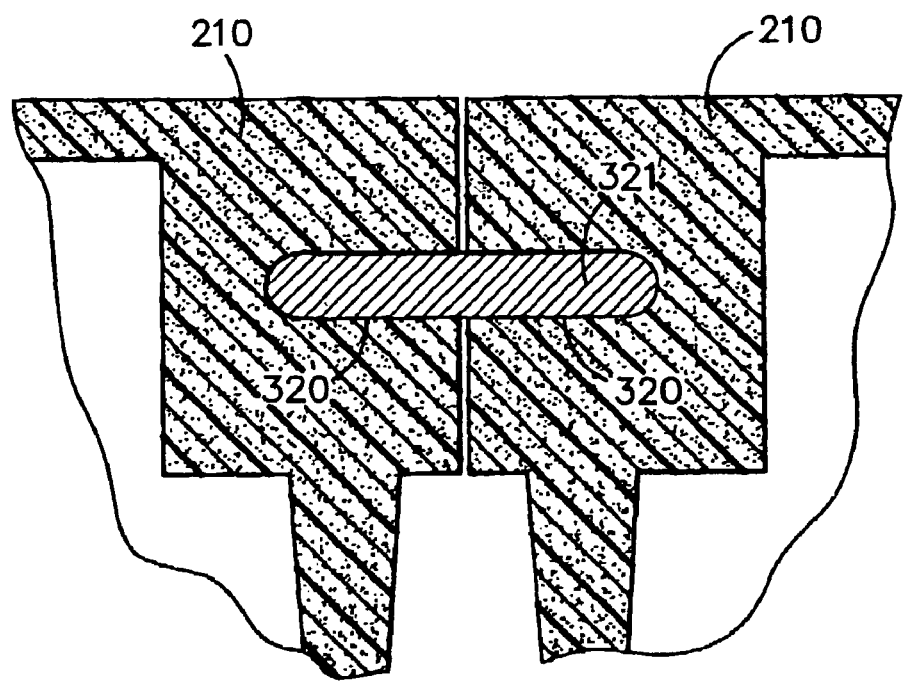

In the embodiment shown in FIGS. 15 to 23, the pallet 210 is moulded to have detachable edge retainers 250. It is however understood that the pallet could be moulded to have no edge retainers at all as shown in FIG. 28a or to have a fixed integrally formed edge retainer 301 shown in FIG. 26 or as a base unit 304 to facilitate attachment of an edge retainer 302 through screws 303 as shown in FIG. 27. In the embodiment that has no edge retainer shown in FIGS. 28a and 28b, the pallet 305 is moulded to have an inbuilt slot 306 that is inclined at 15° to the vertical inboard of the side edge of the pallet and to be approximately 25 mm in depth with a width of 2 mm. The slot 306 is arranged to accommodate a thin Mylar™ strip 310 that is approximately 0.7 mm in thickness. The strip 310 is 55 mm deep so that 30 mm of the strip extends upwardly of the top surface of the pallet 305 at an angle of 15°. A 1 mm HDPE retaining strip 311 30 mm in depth protrudes 6 mm above the top and is screwed to the Mylar™ strip by three retaining screws 312 shown in FIG. 28a. In another embodiment shown in FIG. 28b, a folded strip 315 of Mylar™ having a 30 mm, 15° upward projection is secured to the top surface of the pallet 305 by staples 309. In both cases, this pallet 305 is used to support artificial turf that extends to a height of 62 mm above the top of the pallet with an infill of sand and rubber being 40 mm in depth. The Mylar™ strip 310 prevents escape of the infill when the pallet 305 is transported.

Figure 24:
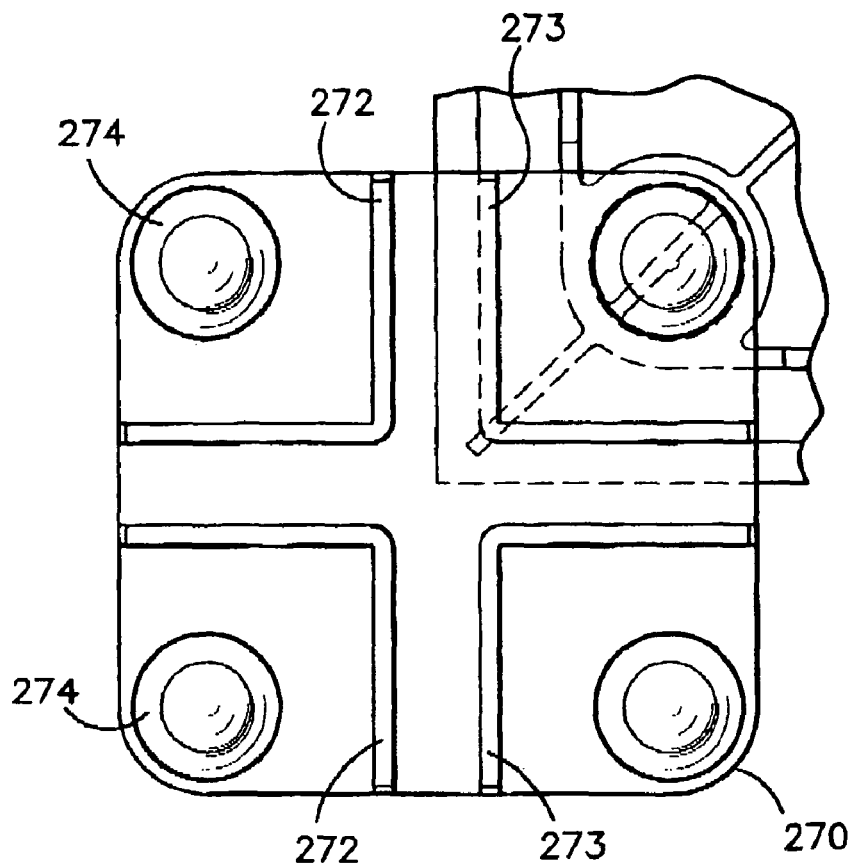
FIG. 24 is a plan view of a locator for the corner of the pallet.
Figure 25:
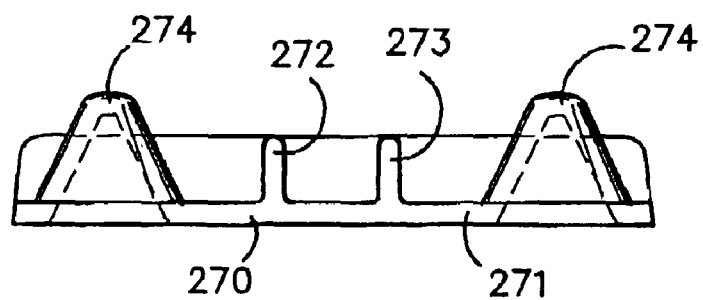
FIG. 25 is a side elevation of the locator.
Figure 26:
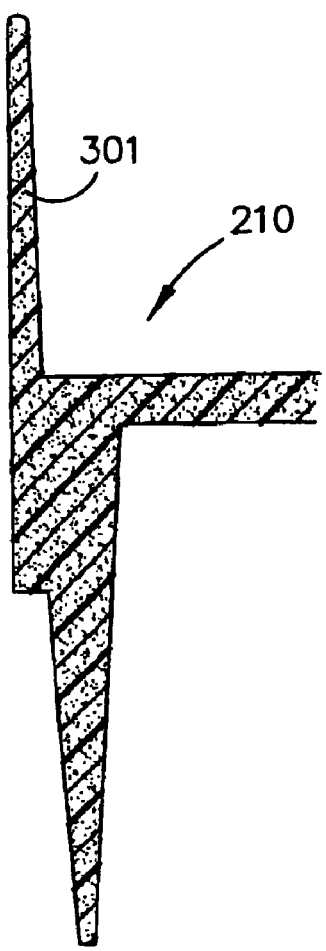
FIG. 26 is a cross sectional view of an alternative edge section for the pallet with the retaining edge integrally formed with the pallet.

Each corner locator 270 is shown in FIGS. 24 and 25 and comprises a planar surface 271 that has a central crossed pair of raised walls 272, 273 and in each corner a frusto-conical stud 274. As shown in FIGS. 15 and 16, the corner of the pallet 210 engages within the open channel defined by the raised walls 272, 273 the frusto-conical stud 274 locates in a recess 275 in the underside of the pallet 210. In this way, each locator can accommodate the four corners of four adjacent pallets that are positioned in close proximity to each other. The raised walls 272, 273 of each locator 270 thus defines the spacing of the pallets that varies slightly for natural and synthetic turf.

The pallet halves and the locators, as well as the edge retainers, are moulded in foamed HDPE.

As shown in FIG. 20 the upper surface 220 of the pallet 210 is provided with tapered drainage holes 235 positioned adjacent the wall structures and towards the centre of each lattice work structure. The upper surface 220 also includes carpet dimples 245 to assist in location of synthetic turf. Synthetic turf is usually in the form of a nylon carpet with tufts located in a base structure. It is usual to fill the carpet with an aggregate of sand and rubber to define the playing surface. When the pallet is used with natural turf, a fine cloth is usually placed over the upper surface 220 of the pallet 210 onto which the turf product can be directly laid. The natural turf usually comprises a grass root zone on a layer of sand/peat reinforced with plastics mesh inserts known as Re Flex®. The pallet 210 is usually 140 mm in depth and the natural turf extends to a further 125 mm above the upper surface of the pallet. The upstanding walls of the edge retainers 250 support natural turf for 81 mm. The artificial turf is usually 50 mm-60 mm above the upper surface 225 of the pallet 210 and it is thus understood that, when used with both artificial and natural turf, suitable lifting means may have to be incorporated within the pallet to raise it to the height to ensure that the artificial turf is at the same level as the natural turf. The pallet 210 when unladen weighs approximately 70 lbs and the pallet is designed to be a square of 2.29 metres.

The pallet is preferably constructed from structural foam using commingled plastics, foamed through the use of Nitrogen gas. The commingles plastic is a mixture of some or all of the following: High Density Polyethylene (HDPE), Low Density Polyethylene, Polypropylene, fibres, ABS, and long fibres for reinforcement. The pallet when unladen weighs approximately 70 lbs to 150 lbs depending on plastics mixture used and the pallet is designed to be a square of 2.29 metres. The pallet described above is moulded in foamed plastic using lacing technology. Nitrogen gas is used to expand the plastics to produce a micro cellular arrangement, thereby substantially lightening the structure. This technique also allows the use of commingled plastics. High Density Polyethylene (HDPE) is viewed as the most suitable plastics and this provides a structure that is sufficiently strong to withstand the loads that will be subjected to both natural and artificial turf. The plastics can have the gas mixture varied to enhance impact, strength and flexibility. The plastics can also be recycled plastics.

The lattice work structure defined by the wall structure of the pallet halves provides good drainage facility whilst excellent aeration for the root structure of natural turf that may be located above the pallet. The open structure of the underside of the pallet ensures that there is no likelihood of the pallet aquaplaning on a smooth surface.

The pallets described above have to satisfy two important criteria, namely the structures need to be sufficiently flexible to ensure that they lay flat on the support surface that is usually a slab of concrete. This is especially the case when used to support artificial turf that is considerably lighter than natural turf. With artificial turf, it is very important that the corners of each pallet do not arch upwardly. It is also important that there is no wobble. To solve this problem it is proposed in the embodiment shown in FIGS. 29a and 29b to provide slots 320 in the adjoining edges of the four adjacent pallets 210 that make up a corner to accommodate a pin 321 that extends across the edges of the four pallets and prevents the edges of the pallets arching upwardly at the join. The slots would be approximately 10 mm wide and 25 mm deep to extend about 155 mm in length.

The open structure of the underside of the pallet provides a flexible construction that can accommodate the uneven and possibly rough surface of the supporting substrate that is usually a concrete slab. The moulding of the pallet in a foamed plastic can by variation of the mix increase this flexibility to ensure a flat even support without the problem of wobbling.

Another important characteristic of turf assemblies of the kind described above is the impact resistance, especially when used with sports such as the various kinds of football i.e. soccer, football or rugby. There is a known impact resistance test that is measured by a clegg hammer tested with a 2.25 kg hammer at a drop height of 450 mm. This impact resistance is measured in gravity units and it is generally viewed that an acceptable impact resistance is between 40-70 gravity units whilst resistance of 110 or more is too severe and likely to cause injury. The tests have been carried out to compare the impact resistance from the following combinations:

a) turf carpet directly on a concrete surface;
b) turf carpet on a rubber underlay on a concrete surface. This underlay was designed to be substantially similar to the underlay that is used in some artificial turf layouts;
c) carpet on a plastics pallet of the kind described above sitting directly on a concrete surface (1) with the impact resistance being directly against the plastic rib supports and
(2) with the impact resistance being measured between the supports.

The results for three clegg hammer drops are illustrated in the following table:

| Hammer Drops | 1 | 2 | 3 |
|---|---|---|---|
| a | 80 | 90 | 90 |
| b | 50 | 50 | 50 |
| C 1 | 40 | 40 | 40 |
| C 2 | 30 | 30 | 30 |

It is thus concluded that the impact resistance of artificial turf when supported by pallets of the kind described above will be between 30 and 40; well within the desirable range. Tests have also been carried out on natural turf modules that are between 100-120 mm thick turf squares sitting directly on concrete and these produce an impact range of between 55-60 gravity units. Since it is desired to manufacture the turf pallets in plastics that provide a greater degree of flexibility than would be the case of a plastics pallet design for artificial turf, it is considered that the impact resistance for natural turf on such pallets would be unlikely to be higher than 40 units.

Figure 31A:
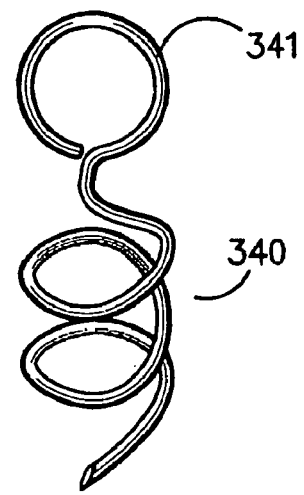
FIGS. 31a, 31b and 31c are schematic illustrations of another mechanism for lifting the modules from above.

The use of slots extending across both sides of the pallet ensure ready forklift tine access for lifting of the pallet and turf assemblies and it is understood that the pallet can be further modified to facilitate vertical lifting through either direct contact with the pallet or contact into the turf which is in turn attached to the pallet to cause the assembly to be lifted. FIGS. 30 and 31 illustrate mechanisms that facilitate vertical lifting. In FIG. 31a each pallet is provided with a lifting lug connection 130 in each corner of the pallet. Two options of the lug connection 130 are shown in FIG. 16c that can be either between a cross web and a side flange in the join between the web and the side flange. FIG. 30b shows a tool 131 that has a handle 132 that is joined to an elongate shaft 133 that terminates in a head 135. The head has a T shaped end to enable it to be inserted into the locator 130 and then turned through 90° to engage the underside of the locator. With four such tools engaging each corner of the pallet 210 it is possible to lift the pallet 210 and turf product without the use of forklift tines.

Figure 31B:
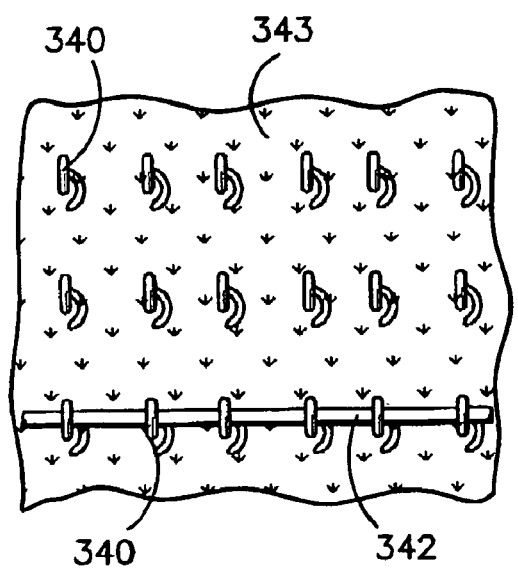
Figure 31C:
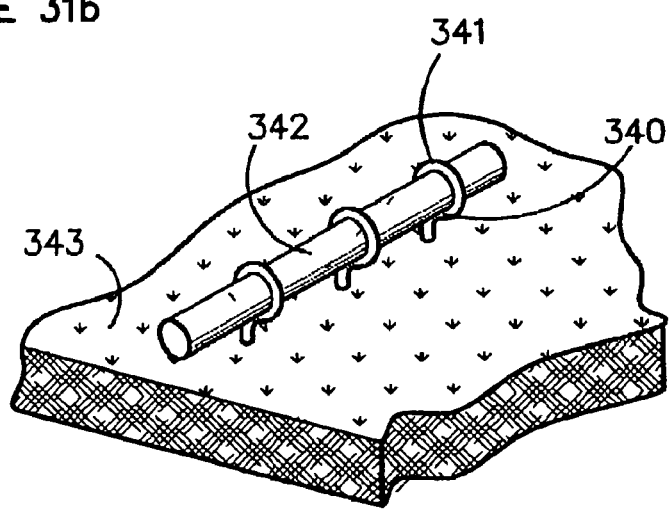

In the embodiment shown in FIGS. 31a, 31b and 31c there is a cork screw style device 340 that has a annular end 341 that is adapted to engage a bar 342 by screwing the corkscrew style device into the turf 343 the coils of the screw engage and grip the turf 343 and then by placing the bar 343 through a series of these devices 340 that are arranged in parallel and lifting the bars the whole turf product can be lifted either clear of the pallet or, if the turf is attached to the pallet, with the pallet. It is also understood that the corkscrew device 340 instead of simply screwing into the turf could, in certain circumstances, screw through the turf to engage the pallet thereby ensuring lift of both the pallet and the turf without necessarily having to attach the turf to the pallet.

The pallet structure described above is sufficiently light yet durable to withstand the impacts and stresses of use, to provide ready support for the turf when used as a playing field whilst at the same time providing a means for facilitation transportation and storage of turf, especially natural turf which can be transported to a suitable site for regrowth.

The versatility of the pallet described above especially with its capacity to support natural and or artificial turf and the capacity of individually identifying each pallet and storing this information in a computer allows a stadium to manage the placement of its turf. The computer can monitor the use time and wear assessment of the turf and select appropriate pallets for movement to even out wear characteristics and maximize utilization of the total field. Movement of the pallets also facilitates offsite application of lines or coloured images such as sponsors logos prior to installation in the stadium.

It is understood that the system facilitates the ability to pick up and move pallets as desired, thus when a stadium is for multipurpose use all the turf can be removed exposing the concrete base for concerts and like entertainment and when there is a need for sporting venue the turf can be moved back to the stadium. In the interim the artificial turf can be stacked in racks and the natural turf can be taken to a position of optimum growth.

The design of the pallets is such that natural turf can be left on the pallet and stored with adequate drainage being provided under the pallet to provide optimum growth especially in an environment that encourages growth in contrast to environments usually provided by a stadium where cantilevered stands block out sunlight and retard growth of natural turf.

A sophisticated conveyor system is envisaged that would automatically transport the pallets to both a racked storage facility for artificial turf and a nursery position for natural turf. However it is considered that the turfing option described above allows stadiums to be designed without the need to have roof systems that can open and close. These systems are very expensive to build and to maintain and are merely a compromise. A closed roof provides the optimum conditions for stadium use and with the ability to simply and effectively remove the turf the problems associated with a closed roof are overcome. It is estimated that installation of natural turf can be completed within twelve hours using pallets of the kind described above and it similarly takes about eight hours to totally remove the turf units allowing the stadium to be used for other functions that would be based on the underlying concrete floor.

The use of pallets with edge retainers to support artificial turf substantially enhances the ability to move and transport artificial turf which is usually impossible because the turf is in long rolls which once spread out across the concrete base are then filled with an infill fill of sand and rubber which means that the sand and rubber infill has to be removed before the turf can be rolled up. With pallets bordered by edge retainers which can be butted together the artificial turf can be removed in squares without loss of the infill thus rendering stadiums that use such turf considerably more versatile.

The claims defining the invention are as follows:

1. A liftable support structure for a turf system, the support structure comprising a skeletal framework having an open base structure with upstanding sides and at least two parallel spaced cross beams, the framework defining open subsections, each subsection having a base defining a ledge structure, the ledge structure extending inwardly from a periphery of the base, each subsection supporting a latticework panel that sits on the ledge structure, the framework having a plurality of spaced lifting points and the cross beams defining access to forklift tines.

2. The support structure according to claim 1 wherein the latticework panel is injected molded in plastics and sits flush within each subsection.

3. The support structure according to claim 1 wherein the latticework panel comprises a combination of a criss-cross metal structure on which is supported a thin latticework plastics panel so that the combination sits flush within each subsection.

4. The support structure according to claim 1 wherein the plurality of spaced lifting points each comprises an entry point adapted to accommodate a lifting lug which can be inserted into the entry portion from above.

5. The support structure according to claim 4 wherein four lifting points are evenly spaced centrally of the support structure.

6. The support structure according to claim 1 when the skeletal framework is constructed from galvanised steel.

7. The support structure according to claim 1 wherein the cross beams are interconnected by transverse beams to define the plurality of subsections.

8. A modular turf system comprising natural turf positioned on an array of liftable support structures according to claim 1 in abutting contact side to side or end to end.

9. A modular turf system according to claim 8 wherein a fine cloth or mesh is placed between the support structure and the natural turf.

10. A modular turf system according to claim 8 wherein each liftable support structure is located in abutting contact on locater plates that engage with the framework of each adjacent structure.

11. A portable tennis court comprising two modular turf systems according to claim 8 joined in abutting contact whereby the line of abutting contact defines the line of the net.

12. A cricket wicket comprising an elongate receptor having an open top and inwardly inclined sides, the receptor being arranged to be located in the ground surface with the top flush with the surface, a modular turf system being positioned with the receptor, the turf system comprising a plurality of rectangular liftable support structures positioned in end to end abutting contact and covered by natural turf, each support structure comprising a skeletal framework having an open based structure with upstanding sides and at least two parallel spaced cross beams, the framework defining open subsections, each subsection having a base defining a ledge structure the ledge structure extending inwardly from a periphery of the base, each subsection supporting a latticework panel that sits on the ledge structure, the framework having a plurality of spaced lifting points, the longer sides diverging upwardly and outwardly to mate with the inclined sides of the receptor.

13. The cricket wicket according to claim 12 wherein the lifting points are spaced along and adjacent the longer sides of the support structures.

\* \* \* \* \*